(12) United States Patent
Kim

(10) Patent No.: US 9,939,062 B2
(45) Date of Patent: Apr. 10, 2018

(54) METHOD OF CHECKING ABNORMALITY IN OIL PRESSURE OF TCU

(71) Applicant: Hyundai Motor Company, Seoul (KR)

(72) Inventor: Yoh Han Kim, Whasung-Si (KR)

(73) Assignee: Hyundai Motor Company, Seoul (KR)

( * ) Notice: Subject to any disclaimer, the term of this patent is extended or adjusted under 35 U.S.C. 154(b) by 266 days.

(21) Appl. No.: 14/689,430

(22) Filed: Apr. 17, 2015

(65) Prior Publication Data

US 2016/0138708 A1 May 19, 2016

(30) Foreign Application Priority Data

Nov. 17, 2014 (KR) ........................ 10-2014-0159849

(51) Int. Cl.
| | | |
|---|---|---|
| F16H 61/12 | (2010.01) | |
| F16H 59/68 | (2006.01) | |
| F16H 61/00 | (2006.01) | |

(52) U.S. Cl.
CPC ......... *F16H 61/12* (2013.01); *F16H 61/0031* (2013.01); *F16H 2059/683* (2013.01); *F16H 2061/1208* (2013.01); *F16H 2061/1232* (2013.01); *F16H 2061/1264* (2013.01)

(58) Field of Classification Search
None
See application file for complete search history.

(56) References Cited

U.S. PATENT DOCUMENTS

| | | | | |
|---|---|---|---|---|
| 2009/0298644 | A1* | 12/2009 | Nihei | B60W 30/18018 477/107 |
| 2011/0166727 | A1* | 7/2011 | Light | B60K 6/445 701/22 |
| 2012/0296509 | A1* | 11/2012 | Wakita | B60W 10/06 701/22 |

FOREIGN PATENT DOCUMENTS

| | | |
|---|---|---|
| JP | 2006-170399 A | 6/2006 |
| JP | 2011-117333 A | 6/2011 |
| KR | 10-2011-0107975 A | 10/2011 |
| KR | 10-2012-0063258 A | 6/2012 |
| KR | 10-2012-0105393 A | 9/2012 |

* cited by examiner

*Primary Examiner* — Edwin A Young
(74) *Attorney, Agent, or Firm* — Morgan, Lewis & Bockius LLP

(57) ABSTRACT

A method of checking an abnormality in oil pressure of a transmission control unit (TCU) may include determining whether an oil pressure signal transmitted from the TCU to an electric oil pump (EOP) device is normal, transmitting a specific oil pressure value to the EOP device, the specific oil pressure value being set for determining whether the oil pressure signal transmitted from the TCU is normal, determining whether an oil pressure corresponding to the specific oil pressure value is sensed at the EOP device, determining whether a decrease range of the oil pressure sensed at the EOP device belongs within a predetermined range when compared to the specific oil pressure value, and determining whether to perform abnormality control over a transmission by operating the EOP device at set minimum revolutions per minute when the decrease range of the oil pressure sensed at the EOP device is beyond the predetermined range.

4 Claims, 3 Drawing Sheets

METHOD OF CHECKING ABNORMALITY IN OIL PRESSURE OF TCU

CROSS REFERENCE TO RELATED APPLICATION

The present application claims priority to Korean Patent Application Number 10-2014-0159849 filed Nov. 17, 2014, the entire contents of which is incorporated herein for all purposes by this reference.

BACKGROUND OF THE INVENTION

Field of the Invention

The present invention relates to a method of checking an abnormality in the oil pressure of a transmission control unit (TCU). More particularly, the present invention relates to a technology able to determine an abnormality in an oil pressure signal transmitted from a TCU to an electric oil pump (EOP) and inspect an EOP flow variation learning logic based on the determination, thereby ensuring that the EOP supplies oil in a reliable manner and preventing a transmission from being damaged.

Description of Related Art

An EOP flow variation learning logic of the related art will be described in brief in order to help the understanding of the present invention.

FIG. 1 is a flowchart illustrating an EOP flow variation learning logic of the related art. The EOP flow variation learning logic is realized in a TCU.

As illustrated in FIG. 1, the EOP flow variation learning logic generally includes step S10 of starting learning, step S20 of satisfying a learning environment, step S30 of learning the revolutions per minute (RPM) of an EOP by measuring an oil pressure, and step S40 of completing the learning.

At the step S10 of starting learning, the TCU transmits a preset oil pressure signal from to the EOP through controller area network (CAN) communication.

Afterwards, it is determined whether or not a learning environment for the TCU to learn variations in the oil flow supplied from the EOP is satisfied.

At the process of determining whether or not the learning environment is satisfied, requirements are, for example: 1) the temperature of automatic transmission fluid (ATF) ranging from 40 to 100° C.; 2) a gear position at P position or N position; 3) no absolute pressure sensor (APS) input; and 4) no malfunction of an oil pump unit (OPU), a TCU and other pressure sensors. When these requirements are satisfied, the TCU is determined to be prepared for the learning.

Afterwards, the step of learning the RPM of the EOP by measuring the oil pressure is carried out. According to the learning, an EOP RPM map stored in the TCU is corrected. The EOP RPM map consists of oil temperatures and oil pressures according to the EOP flow variation learning logic.

The present invention is intended to improve the above-described EOP flow variation learning logic. An object of the present invention is to provide a method of checking an abnormality in the oil pressure of a TCU able to allow the EOP to revolve at an optimum RPM by determining whether or not an oil pressure signal transmitted from the TCU to the EOP is normal, with the RPM of the EOP being optimized in consideration of the mileage of a vehicle.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a method of checking an abnormality in the oil pressure of a transmission control unit (TCU) able to inspect an abnormality in the oil pressure of an electric oil pump (EOP) due to an abnormality in gear shifting using an EOP flow variation learning logic, ensure that oil be supplied in a reliable manner by increasing the flow rate of the oil in response to a decrease in the oil pressure within a predetermined range, and sense a decrease in the oil pressure that is beyond the predetermined range such that a transmission may be damaged.

According to various aspects of the present invention, a method of checking an abnormality in oil pressure of a TCU may include determining whether or not an oil pressure signal transmitted from the TCU to an EOP is normal, transmitting a specific oil pressure value to the EOP, the specific oil pressure value being set for determining whether or not the oil pressure signal transmitted from the TCU is normal, determining whether or not an oil pressure corresponding to the specific oil pressure value is sensed at the EOP, determining whether or not a decrease range of the oil pressure sensed at the EOP belongs within a predetermined range when compared to the specific oil pressure value, and determining whether or not to perform abnormality control over a transmission by operating the EOP at set minimum revolutions per minute when the decrease range of the oil pressure sensed at the EOP is beyond the predetermined range.

The step of determining whether or not the oil pressure corresponding to the specific oil pressure value is sensed at the EOP may include, when the oil pressure corresponding to the specific oil pressure value is sensed at the EOP, determining that the transmission operates normally and operating the EOP at revolutions per minute learned at an EOP flow variation learning logic.

The method may further include, when the decrease range of the oil pressure sensed at the EOP belongs within the predetermined range, resetting the EOP flow variation learning logic and performing relearning, and revolving the EOP at revolutions per minute learned through the relearning.

The step of determining whether or not to perform the abnormality control over the transmission by operating the EOP at the set minimum revolutions per minute when the decrease range of the oil pressure sensed at the EOP is beyond the predetermined range may include determining whether or not control over the transmission is normal by determining whether or not the oil pressure signal transmitted from the TCU to the EOP is normal when operating the EOP at the minimum revolutions per minute, and stopping the operation of the vehicle when an abnormality in the oil pressure is sensed in the step of determining whether or not the control over the transmission is normal.

At the process of determining whether or not the control over the transmission is normal by determining whether or not the oil pressure signal transmitted from the TCU to the EOP is normal, the vehicle may be maintained to operate when it is determined that the transmitted oil pressure signal is normal at the process of determining whether or not the control over the transmission is normal.

In the method of checking an abnormality in the oil pressure of a TCU according to the invention as set forth above, a logic able to inspect an abnormality in the oil pressure due to an abnormality in a transmission using an EOP flow variation learning logic is added. This logic can also ensure that oil be supplied in a reliable manner by setting an optimum RPM of the EOP by increasing the flow rate of the oil in response to a decrease in the oil pressure within a predetermined range and inspect a malfunction due to an abnormality in the oil pressure. Accordingly, a variety of merits are provided. For example, a defective rate due to damage in the transmission is decreased.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
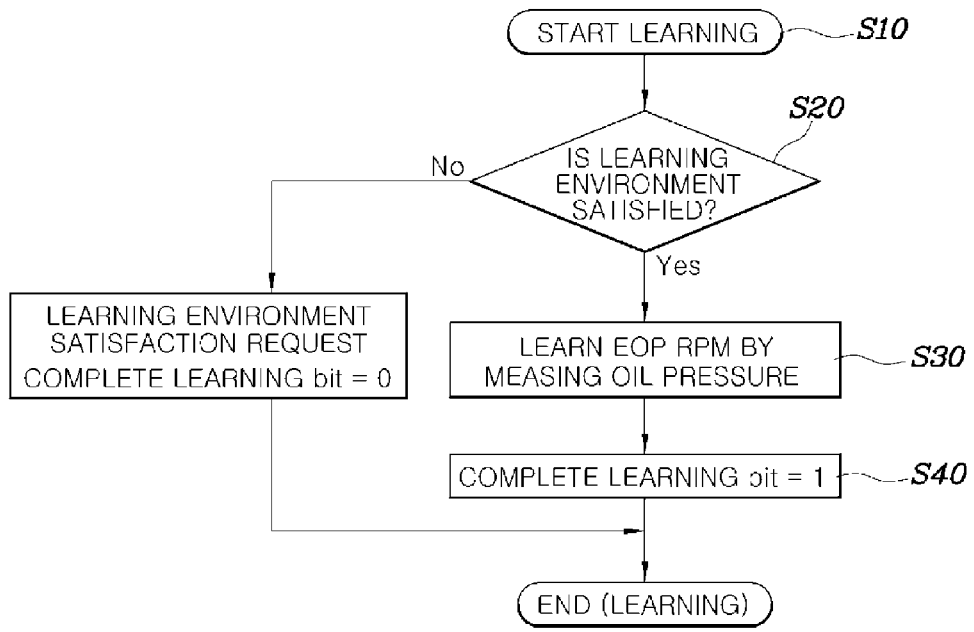
FIG. 1 is a flowchart illustrating an electric oil pump (EOP) flow variation learning logic of the related art.
Figure 2:
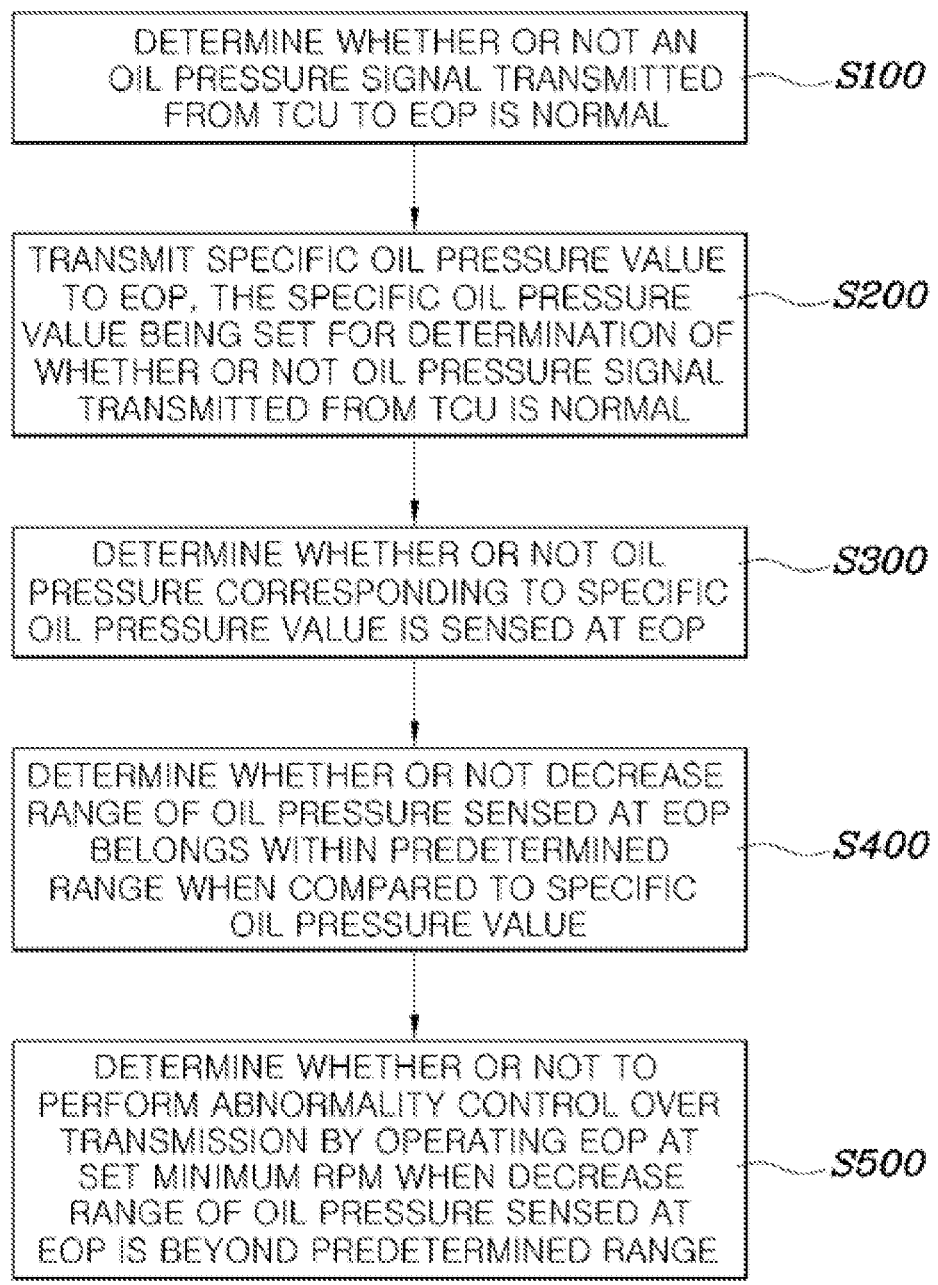
FIG. 2 is a flowchart illustrating an exemplary method of checking an abnormality in the oil pressure of a Transmission Control Unit (TCU) according to the present invention.
Figure 3:
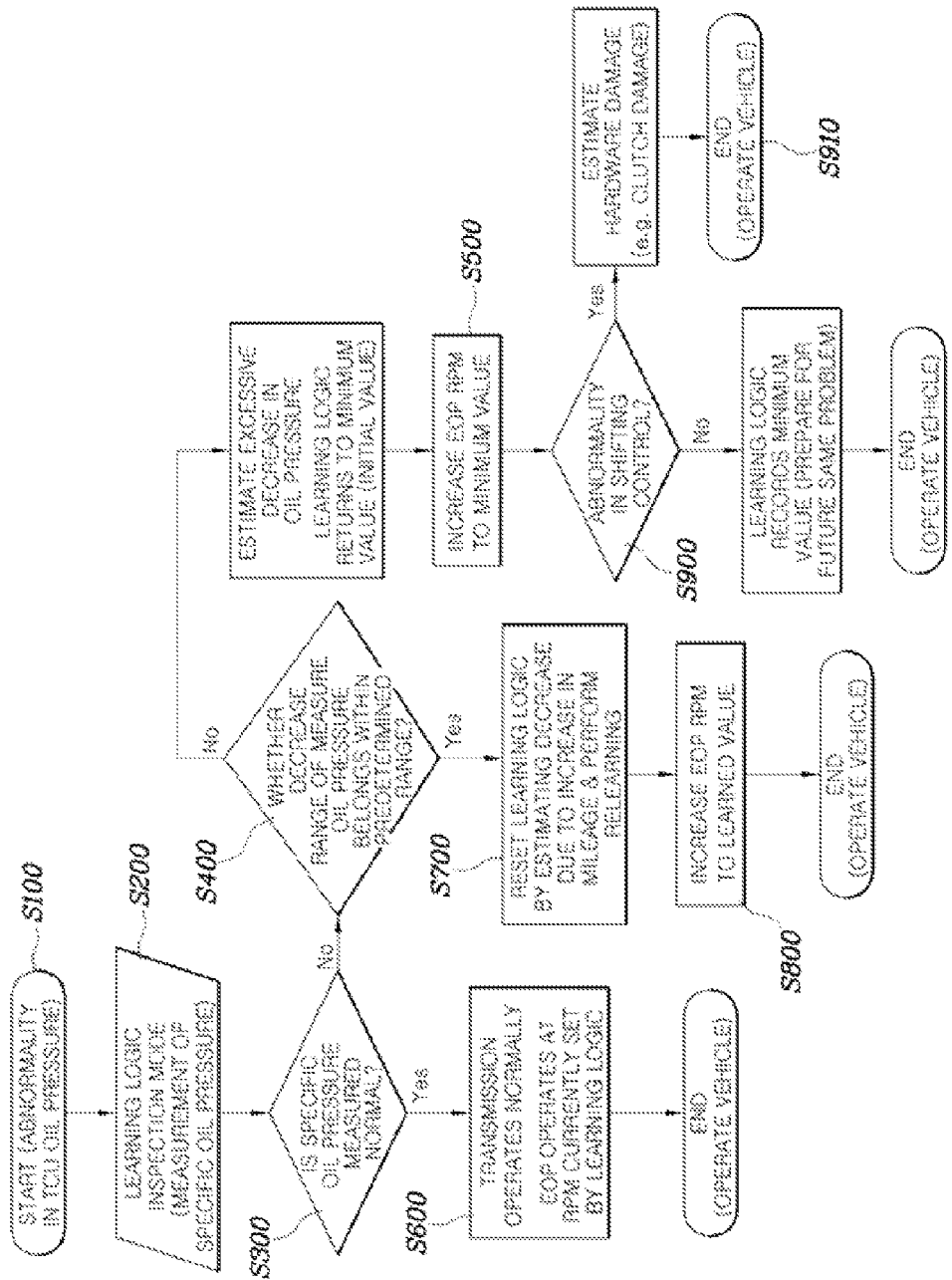
FIG. 3 is a flowchart specifically illustrating steps of the exemplary method of checking the abnormality in the oil pressure of the TCU according to the present invention.

FIG. 2 and FIG. 3 are flowcharts illustrating the overall processes of the method of checking an abnormality in the oil pressure of a Transmission Control Unit (TCU) according to various embodiments of the present invention.

As illustrated in FIG. 2 and FIG. 3, the method according to various embodiments includes step S100 of determining whether or not an oil pressure signal transmitted from a transmission control unit (TCU) to an electric oil pump (EOP) device is normal, step S200 of transmitting a specific oil pressure value to the EOP device, the specific oil pressure value being set for the determination of whether or not the oil pressure signal transmitted from the TCU is normal, step S300 of determining whether or not an oil pressure corresponding to the specific oil pressure value is sensed at the EOP device, step S400 of determining whether or not a decrease range of the oil pressure sensed at the EOP device belongs within a predetermined range when compared to the specific oil pressure value, and step S500 of determining whether or not to perform abnormality control over the transmission by operating the EOP device at set minimum revolutions per minute (RPM) when the decrease range of the oil pressure sensed at the EOP device is beyond the predetermined range.

First, the step of determining whether or not an oil pressure signal transmitted from a TCU to an EOP device is normal is carried out.

In general, the TCU applies an initial RPM to the EOP device in order to operate the EOP device. At this time, the TCU transmits the initial RPM to the EOP device through controller area network (CAN) communication.

Subsequently, the EOP device operates according to the initial RPM applied from the TCU. The TCU transmits an oil pressure control signal to the EOP device, and the EOP device supplies oil to a transmission according to the oil pressure control signal received from the TCU.

Afterwards, the step of transmitting a specific oil pressure value to the EOP device is carried out. The specific oil pressure value is set for the determination of whether or not the oil pressure signal transmitted from the TCU is normal.

The specific oil pressure value may be set variously, and a previously-stored value may be used in consideration of the operating state of a vehicle.

Thereafter, the step of detecting, at the EOP device, an oil pressure corresponding to the specific oil pressure value is carried out. In real time, the EOP device senses the pressure of the supplied oil and transmits the sensed oil pressure to the TCU.

Through this process, it is possible to determine whether or not the oil pressure signal transmitted from the TCU to the EOP device is normal, and subsequently, the following steps are carried out.

When an oil pressure corresponding to the specific oil pressure value is sensed by the EOP device, step S600 of determining that the transmission operates normally and operating the EOP device at RPM learned in an EOP device flow variation learning logic is carried out.

Specifically, when the oil pressure corresponding to the specific oil pressure value is sensed by the EOP device, it is determined that the oil pressure supplied from the EOP device is normal, and without relearning of the EOP device flow variation learning logic, the oil pressure is applied to a vehicle. Accordingly, the vehicle keeps operating with the EOP device operating at the RPM learned in the EOP device flow variation learning logic The method also includes the step S400 of determining whether or not a decrease range of the oil pressure sensed at the EOP device belongs within the predetermined range when compared to the specific oil pressure value and the step S500 of determining whether or not to perform abnormality control over the transmission by operating the EOP device at the set minimum RPM when the decrease range of the oil pressure sensed at the EOP device is beyond the predetermined range.

First, it is determined whether or not the decrease range of the oil pressure sensed at the EOP device belongs within the predetermined range.

When oil is supplied to the transmission, the oil pressure sensed at the EOP device is generally a value that has decreased by a predetermined value from the oil pressure supplied from the TCU because of an increase in the mileage due to the operation of the vehicle or any reason having the equal effect as the increased mileage.

Considering these factors, a decrease range within which the vehicle is determined to operate without a problem is previously stored in the TCU. When the oil pressure sensed at the EOP device is compared with the specific oil pressure value, it is determined whether or not the difference belongs within the previously-stored decrease range.

According to the present invention, the decrease range stored in the TCU is set to "1 bar". When the difference between the oil pressure sensed at the EOP device and the specific oil pressure value is within the "1 bar", it is determined that the vehicle can operate without a problem.

When the decrease range of the oil pressure sensed at the EOP device is within the "1 bar", step S700 of resetting the EOP device flow variation learning logic and subsequently performing relearning and step S800 of revolving the EOP device with RPM obtained through the relearning are carried out.

Specifically, after the EOP device flow variation learning logic, the relearning is performed. Subsequently, the RPM of the EOP device is increased with the RMP obtained through the relearning.

This can increase the RPM of the EOP device in response to the oil pressure decreasing by a predetermined amount, thereby realizing the effect of reliably supplying the oil pressure at the optimum RMP of the EOP device set through the increase in the oil pressure.

When the oil pressure decreases with the increasing mileage as the vehicle operates, the optimum oil pressure condition is maintained through proper oil pressure compensation.

The step S500 of determining whether or not to perform abnormality control over the transmission by operating the EOP device at the set minimum RPM when the decrease range of the oil pressure sensed at the EOP device is beyond the predetermined range includes step S900 of determining whether or not control over the transmission is normal by determining whether or not the oil pressure signal transmitted from the TCU to the EOP device is normal when operating the EOP device at the minimum RPM, and step S910 of stopping the operation of the vehicle when an abnormality in the oil pressure is sensed in the step of determining whether or not the control over the transmission is normal.

Specifically, when the decrease range of the oil pressure sensed at the EOP device is beyond the predetermined range, i.e. "1 bar", the decrease in the oil pressure is not considered caused by the increase in the mileage due to the operation of the vehicle, and through the above-described step, it is determined whether or not the vehicle can operate.

For this, when the decrease range of the oil pressure sensed at the EOP device is beyond the predetermined range, it is determined whether or not to perform the abnormality control over the transmission by operating the EOP device at the previously-stored minimum RPM. The process of determining whether or not to perform abnormality control over the transmission includes determining whether or not the oil pressure signal transmitted from the TCU to the EOP device is normal when the EOP device is operated at the minimum RPM.

Specifically, when the EOP device is operated at the previously-stored minimum RPM such that a minimum amount of overload is applied to the EOP device, it is determined whether or not the oil pressure of the oil signal transmitted to the TCU to the EOP device is identical to the oil pressure actually supplied to the EOP device in response to the oil signal.

When the abnormality is still sensed from the oil pressure signal regarding the control over the transmission while the EOP device is operating at the minimum RPM, it is determined that a piece of hardware such as a clutch is damaged and that further operation of the vehicle is impossible, and the operation of the vehicle is stopped.

In contrast, when it is determined that the transmission of the oil pressure signal is normal, i.e. there is no abnormality, the minimum input is recorded in the EOP device flow variation learning logic, in preparation for the occurrence of the same problem.

Although the exemplary embodiments of the present invention have been described for illustrative purposes, those skilled in the art will appreciate that various modifications, additions and substitutions are possible, without departing from the scope and spirit of the present invention as disclosed in the accompanying claims.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A method of checking an abnormality in oil pressure of a transmission control unit, the method comprising:
   determining, whether or not an oil pressure signal transmitted from the transmission control unit (TCU) to an electric oil pump (EOP) device is normal;
   transmitting a specific oil pressure value to the EOP device, the specific oil pressure value being set for determining whether or not the oil pressure signal transmitted from the TCU is normal;
   determining whether or not an oil pressure corresponding to the specific oil pressure value is sensed at the EOP device;
   determining whether or not a decrease range of the oil pressure sensed at the EOP device belongs within a predetermined range when compared to the specific oil pressure value; and
   determining whether or not to perform abnormality control over a transmission by operating the EOP device at a set minimum revolutions per minute when the decrease range of the oil pressure sensed at the EOP device is beyond the predetermined range,
   wherein the determining whether or not the oil pressure corresponding to the specific oil pressure value is sensed at the EOP device comprises:

when the oil pressure corresponding to the specific oil pressure value is sensed at the EOP device, determining that the transmission operates normally and operating the EOP device at revolutions per minute learned at an electric oil pump flow variation learning logic.

2. A method of checking an abnormality in oil pressure of a transmission control unit, the method comprising:
   determining, whether or not an oil pressure signal transmitted from the transmission control unit (TCU) to an electric oil pump (EOP) device is normal;
   transmitting a specific oil pressure value to the EOP device, the specific oil pressure value being set for determining whether or not the oil pressure signal transmitted from the TCU is normal;
   determining whether or not an oil pressure corresponding to the specific oil pressure value is sensed at the EOP device;
   determining whether or not a decrease range of the oil pressure sensed at the EOP device belongs within a predetermined range when compared to the specific oil pressure value;
   determining whether or not to perform abnormality control over a transmission by operating the EOP device at a set minimum revolutions per minute when the decrease range of the oil pressure sensed at the EOP device is beyond the predetermined range;
   when the decrease range of the oil pressure sensed at the electric oil pump device belongs within the predetermined range, resetting an EOP device flow variation learning logic and performing relearning; and
   revolving the EOP device at revolutions per minute learned through the relearning.

3. A method of checking an abnormality in oil pressure of a transmission control unit, the method comprising:
   determining, whether or not an oil pressure signal transmitted from the transmission control unit (TCU) to an electric oil pump (EOP) device is normal;
   transmitting a specific oil pressure value to the EOP device, the specific oil pressure value being set for determining whether or not the oil pressure signal transmitted from the TCU is normal;
   determining whether or not an oil pressure corresponding to the specific oil pressure value is sensed at the EOP device;
   determining whether or not a decrease range of the oil pressure sensed at the EOP device belongs within a predetermined range when compared to the specific oil pressure value; and
   determining whether or not to perform abnormality control over a transmission by operating the EOP device at a set minimum revolutions per minute when the decrease range of the oil pressure sensed at the EOP device is beyond the predetermined range,
   wherein the process of determining whether or not to perform the abnormality control over the transmission by operating the EOP device at the set minimum revolutions per minute when the decrease range of the oil pressure sensed at the EOP device is beyond the predetermined range comprises:
   determining whether or not control over the transmission is normal by determining whether or not the oil pressure signal transmitted from the TCU to the EOP device is normal when operating the EOP device at the minimum revolutions per minute; and
   stopping the operation of the vehicle when the abnormality in the oil pressure is sensed in the process of determining whether or not the control over the transmission is normal.

4. The method according to claim 3, wherein, at the determining whether or not the control over the transmission is normal by determining whether or not the oil pressure signal transmitted from the TCU to the EOP device is normal, the vehicle is maintained to operate when the transmitted oil pressure signal is determined to be normal at the determining whether or not the control over the transmission is normal.

* * * * *